June 11, 1968 W. R. HERRING 3,387,355
APPARATUS FOR PROVIDING A SUBSTRATE WITH A LINER
Filed April 8, 1963 3 Sheets-Sheet 3
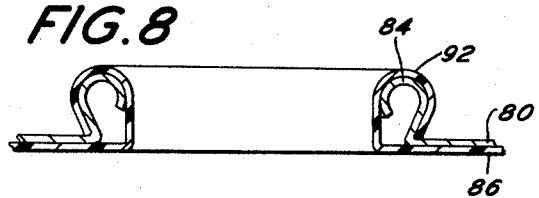
FIG.8
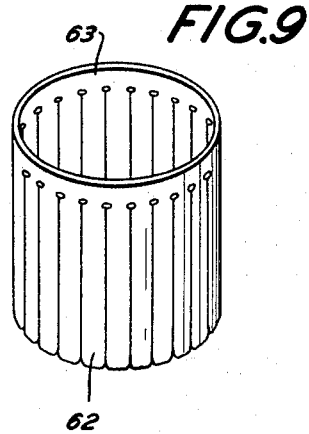
FIG.9
FIG.10
FIG.11
INVENTOR.
WALTER R. HERRING
BY
Arthur H. Seidel
ATTORNEY

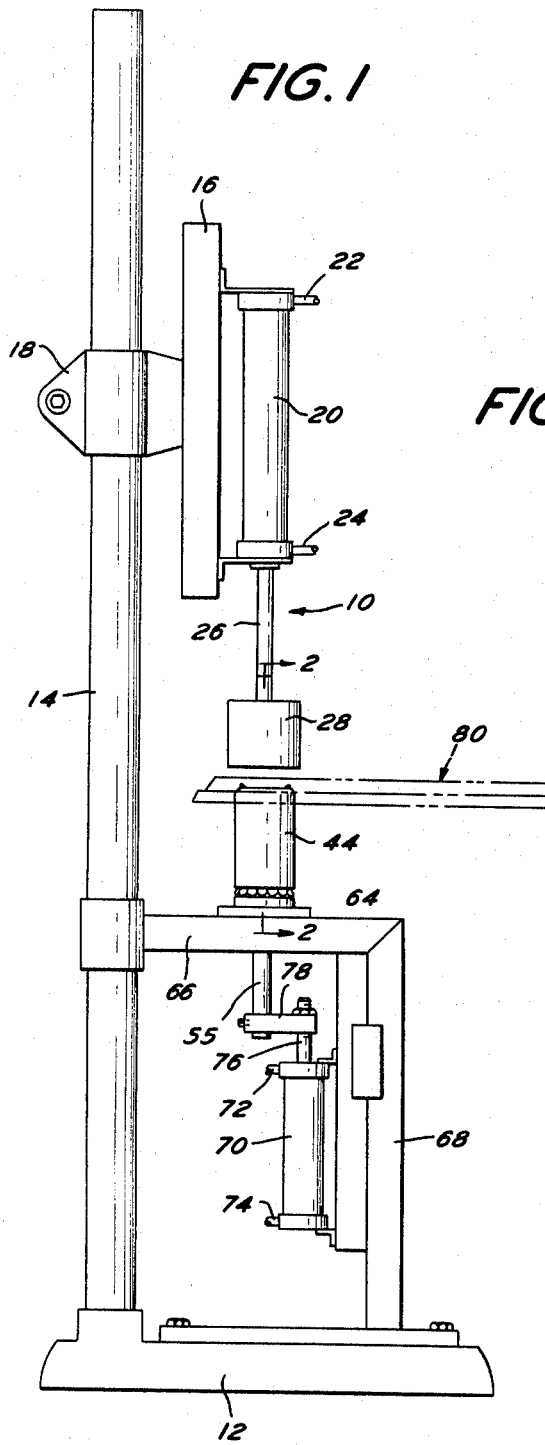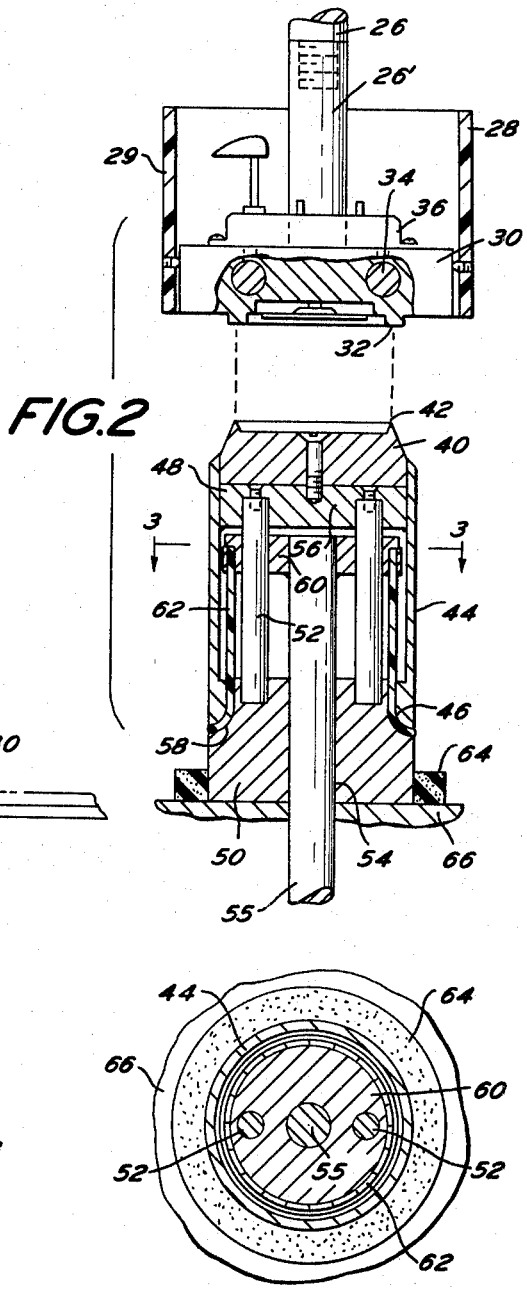

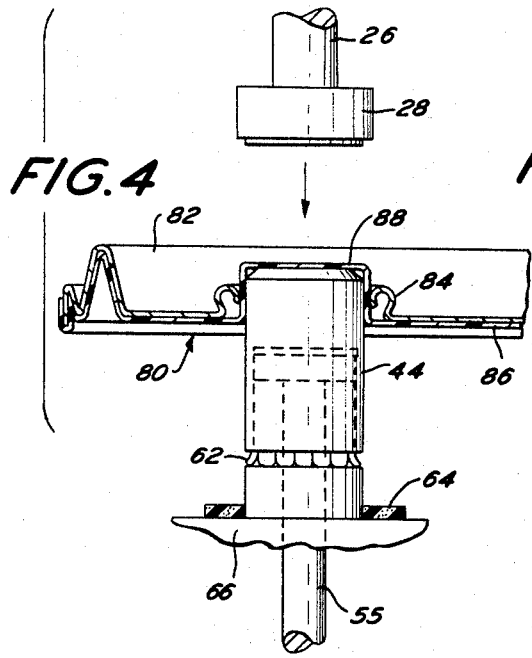
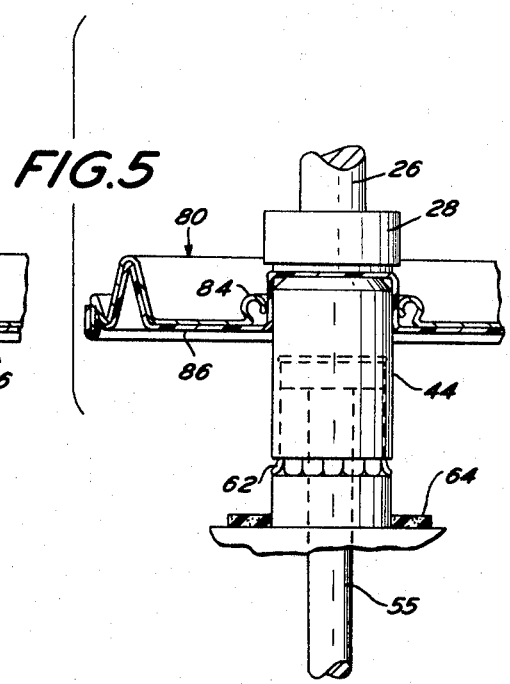
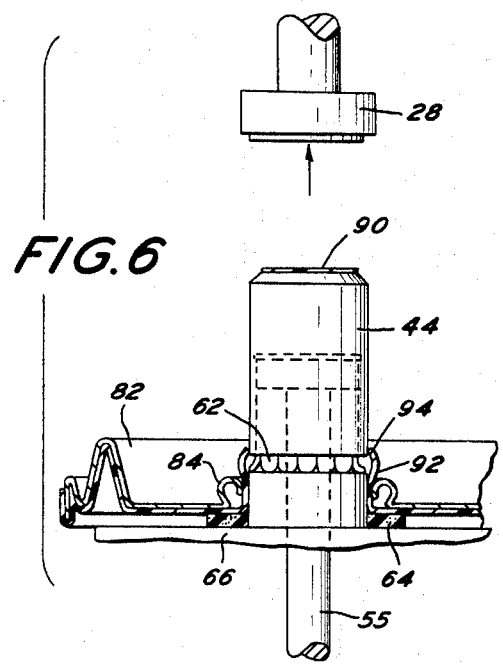
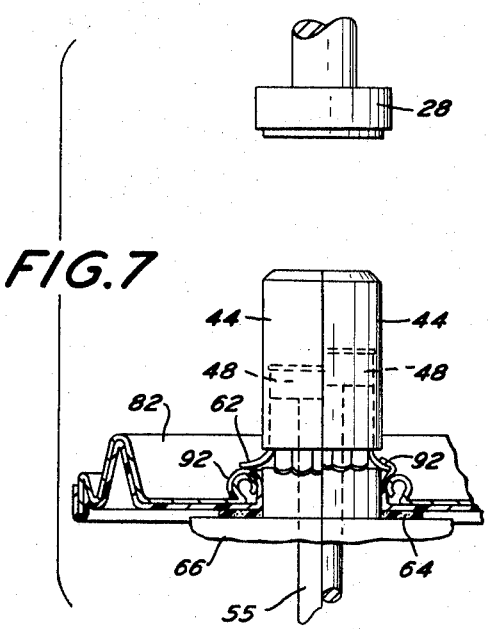

United States Patent Office 3,387,355
Patented June 11, 1968

3,387,355
APPARATUS FOR PROVIDING A SUBSTRATE WITH A LINER
Walter Raymond Herring, Unionville, Pa., assignor, by mesne assignments, to Container Corporation of America, Chicago, Ill., a corporation of Delaware
Filed Apr. 8, 1963, Ser. No. 271,126
14 Claims. (Cl. 29—235)

This invention relates ot apparatus for providing a substrate with a liner. In particular, the present invention is related to the mechanical joining of a flexible polymeric film, such as a thin sheet of polyethylene, onto rigid substrates such as sheet metal covers for containers and the like.

In general, the present invention is related to the art of packaging, but has applications in a wide variety of fields. Heretofore, rigid all plastic containers have been utilized for storing and transporting chemical, liquids, and granular materials which are of such a nature that they could not be disposed within metal containers because of a chemical or other reaction which woud take place. While useful, economical and practical considerations prevent employment of such containers as low cost expendable shipping containers, low cost practical containers of known construction are available and may be used providing certain improvements are made.

Relatively low cost, mass produced metal and/or metal-fiber containers can be endowed with the desirable qualities afforded by such plastics when a lightweight, thin film barrier is employed on the inner surface of the container. Such composite containers feature an inner barrier film intimately disposed on the inner surface of the container and then possess the dual advantages of the plastic containers combined with the desirable features of the metal and/or metal-fiber containers.

In combining a barrier film with a heretofore conventional metal and/or metal-fiber container, certain practical problems arise. The present invention relates to apparatus and method for satisfactorily and efficiently solving a specific problem with respect to joining a barrier film to the cover for the container. It will be understood, however, that the method and apparatus of the present invention are not restricted to the described instance of use, but can be employed in a variety of non-related applications where the method and apparatus can achieve the desired end result.

Metal and/or metal-fiber containers are generally provided with a removable cover. The cover is generally fixed to the container body by a known means and firmly held in place by a known clamping device, such as a locking retaining ring. In some instances, the cover device may be permanently assembled to the container body at the time of manufacture. Thereafter, the access for filling or emptying is accomplished through suitable means such as threaded closures. The cover must have on its inner surface a barrier film similar in properties and effects to the inner surfaces of the container so that the assembled container will present the required barrier film throughout its entire inner surfaces.

Where plain metal discs are employed as covers for containers, it is a relatively easy matter to provide a contoured sheet of plastic film barrier material. The plastic disc may be merely placed on the open end of the container, and then held in place when the metallic disc cover is seated and locked in position. To facilitate handling and to assure proper alignment, the plastic disc may further be affixed by providing a known suitable adhesive between the disc and the metal cover.

It is often desirable to provide openings in the cover to allow conventional filling and/or emptying operations to be effected without removing the cover. Heretofore, it has been conventional to provide a flange on the cover around any such openings for receiving closure members of known construction. Such closure members are generally made of plastic materials compatible with the container linings and are of such construction that no metal components are exposed to the inner surface of the container. It is with respect to such a cover having a flange opening with which the present invention is particularly directed and adapted to be utilized.

It must be appreciated that where barrier films are employed, the film surface must be interrupted to provide access through the cover and the film barrier to the container's contents. If sections of barrier films are provided with apertures adapted to coincide with any apertures in the cover, the resultant discontinuity of the barrier film would defeat the purpose of the barrier film since that portion of the cover around the aperture will be exposed to the contents of the container.

It is an object of the present invention to provide a novel apparatus for joining a barrier film to a rigid substrate.

It is another object of the present invention to provide a novel apparatus for joining a barrier film of polymeric material to a rigid substrate having a flanged opening.

It is another object of the present invention to provide a novel apparatus for providing an uninterrupted barrier film on the inner surface of a metal cover for a container with said cover having a flanged opening.

It is another object of the present invention to provide a novel apparatus for applying barrier films to rigid covers for containers in a manner which is rapid, reliable, effective and economical.

It is another object of the present invention to provide apparatus for joining polyethylene liners to metal container covers in a manner which can be utilized mechanically or manually.

It is still another object of the present invention to provide apparatus for joining a polyethylene barrier film to a metal container cover having a flanged opening in a manner which results in and the entire inner surface of the cover having an uninterrupted barrier film.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a side elevation view of a typical embodiment of the apparatus of the present invention.

FIGURE 2 is a sectional view taken along the lines 2—2 in FIGURE 1.

FIGURE 3 is a sectional view taken along the lines 3—3 in FIGURE 2.

FIGURES 4–7 are diagrammatic illustraitons of the steps involved in practicing the method of the present inveniton with the apparatus illustrated in FIGURES 1–3.

FIGURE 8 is a sectional view through a cover having a flanged opening and a barrier film juxtaposed thereto in accordance with the present invention, with the illustration being an enlarged detail view.

FIGURE 9 is a perspective view of a component of the apparatus of the present invention.

FIGURE 10 is a longitudinal sectional view of the apparatus in accordance with another embodiment of the present invention.

FIGURE 11 is a perspective view of the apparatus illustrated in FIGURE 10, when in use.

Referring to the drawing in detail, wherein like numerals indicate like elements, there is shown in FIGURE 1 a side elevation view of one embodiment of the apparatus of the present invention designated generally as 10.

The apparatus 10 may include a separate frame base 12 or may be mounted on some conventional support such as a table or the like. An upright column 14 is supported by the base 12. A support member 16 is adjustably supported by the column 14 by means of an adjustable clamping or bracket device 18.

A cylinder 20 is supported in an upright disposition by the support member 16 in a conventional manner by use of brackets. The cylinder 20 is provided with motive fluid coupling conduits 22 and 24 at opposite ends thereof. A piston rod 26 extends through an end wall of the cylinder 20 in a downward direction and is coupled to a piston (not shown) within the cylinder 20.

The lower end of the piston rod 26 is adjustably coupled to a connector rod 26' on a trim tool 28. The trim tool 28 includes an annular housing 29 which may be made from any poor conductor of heat such as a thermosetting resin. A cutter body 30, made from a good heat conductor such as aluminum, is adjustably supported within the housing 29 and provided with an annular cutting surface 32 in the form of a downwardly projecting boss.

The body 30 need not be made from a good heat conductor unless it is desired to provide the trim tool 28 with heaters. As illustrated, trim tool 28 is provided with heaters 34 and an adjustable thermostat 36.

An anvil 40 having a cutting edge 42 on its upper surface is disposed below the trim tool 28. The cutting edge 42 is of a configuration corresponding to the configuration of the cutting surface 32. Anvil 40 is supported at the upper end of a cylindrical anvil carrier 44. It will be noted that the cutting edge 42 is disposed radially inwardly from the outer peripheral surface of the carrier 44.

The carrier 44 terminates at its lower end, on its inner surface, in an axially directed surface which merges into a curved surface 46. An anvil support 48 is provided within the carrier 44 immediately below the anvil 40. A plurality, such as two, four or six, of guide rods 52 are provided. Guide rods 52 support the anvil support 48 in a fixed disposition above a base 50.

The base 50 is provided with an axially extending bore 54 which is in line with an axially extending bore 56 in the anvil support 48. A rod 55 extends through the bores 54 and 56 and is guided thereby for reciprocation in an upright direction. The base 50 terminates at its upper outer peripheral portion in an axially extending surface merging into a curved surface 58. Hence, it will be noted that the lower end portion of the barrier 44 and the upper end portion of the base 50 are provided with spaced parallel axially extending surfaces merging into curved surfaces which terminate at the periphery of the carrier 44 and base 50.

A carriage 60 is connected to the rod 55 and guided by the rods 52. A plurality of fingers 62 are carried by the carriage 60. Preferably, the fingers 62 are integral at one end with an annular band 63. The band 63 is clamped to the outer periphery of the carriage 60 in a peripheral notch on said carriage. Hence, as said carriage reciprocates, said fingers reciprocate therewith.

The fingers 62 may be referred to hereinafter as flexible forming members. The fingers 62 and band 63 are capable of being manufactured in a wide variety of processes. One method of making such structure is to start with a small cylinder and provide saw cuts from one end thereby forming the fingers 62. The fingers 62 and band 63 are preferably formed from a flexible material having a thickness of about 0.1 inch. It has been found that the fingers 62 function very efficiently when made from Teflon. However, other materials such as polyethylene may be utilized if desired.

It will be noted that the fingers 62 are of sufficient length so as to extend through the axially extending annular passage and curved passage between the lower end portion of the carrier 44 and the upper end portion of the base 50. The purpose of the fingers 62 will be made clear hereinafter. The base 50 is preferably surrounded by a resilient pad 64 of foam rubber or the like. The base 50 and pad 64 are mounted on a horizontal platform 66 supported above the base 12 by support member 68.

A cylinder 70 is disposed in an upright disposition and supported by the support member 68. Cylinder 70 is provided with motive fluid coupling conduits 72 and 74 at opposite ends thereof. A piston rod 76 extends through the upper end wall of the cylinder 70. The lower end of the piston rod 76 is coupled to a piston (not shown) within the cylinder 70. The upper end of piston rod 76 is coupled to rod 55 by means of an adjustable bracket 78.

The apparatus and method of the present invention is particularly adapted for joining a barrier film 86 to a rigid substrate such as the metal cover 80 for a container. Cover 80 may be of a size up to two feet in diameter or more and may include a peripheral downwardly extending flange, a radially inwardly disposed annular zig-zag bend 82 and an upwardly extending flange 84 surrounding an opening therein. Flange 84, per se, is of known construction and widely employed with known closure devices of excellent characteristics. Flange 84 is formed in a manner so that its upper end is a curved surface corresponding to approximately 180 degrees of a circle.

The barrier film 86 is preferably a film of polyethylene or the like having a thickness of about .002–.1 inch. The barrier film 86 has a peripheral contour corresponding to the contour and configuration of the cover 80. The periphery of the barrier film 86 overlaps both sides of the peripheral depending flange on the cover 80.

The barrier film 86 may be produced by means of a variety of processes. Preferably, the barrier film 86 is formed and shaped so that it corresponds to the shape of the cover and is provided with at least one integral boss 88. The axially extending wall of the boss 88 and the end wall of the boss 88 are of substantially the same thickness with the length of the axially extending wall being slightly greater than the axial length of the flange 84. It will be noted that the end wall of the boss 88 lies in a substantial horizontal plane parallel to the plane of the major portion of the barrier film 86. Preferably, the boss 88 is produced by a vacuum forming process.

The boss 88 has a surface area which is slightly less than the surface area of the flange 84 which is to be covered. The boss 88 is designed and arranged so that when various reverse folds are made, the material will conform to a new shape without wrinkling, creasing or puckering. It has been found that relatively thin films of the polymeric materials utilized for the barrier film 86 possess inherent elasticity which can exceed an elongation value of six hundred percent.

The operation of the apparatus 10 and the method of the present invention is as follows:

A barrier film 86 will be produced as described above and juxtaposed to the substrate, such as the cover 80, in a manner so that the boss 88 extends through the aperture defined by the flange 84. The trim tool 28 will be spaced from the anvil 40 as illustrated in FIGURE 1 so that the barrier film and substrate may be held therebetween.

The operation of the apparatus 10 and the method of the present invention are diagrammatically illustrated in FIGURES 4–7. The substrate and barrier film will be juxtaposed to one another and held in the disposition as illustrated in FIGURE 4. Thereafter, by introducing motive fluid into cylinder 20, the trim tool 28 will be reciprocated downwardly to the position illustrated in FIGURE 5. Since the cutting edge 42 of the anvil 40 is juxtaposed to the inner surface of the end wall of the boss 88, the resultant application of heat and/or pressure by the cutting surface 32 against the cutting edge 42 with the end wall of the boss 88 therebetween results in the cutting of a disc 90 from the end wall of boss 88, as illustrated in FIGURE 6. Thereafter, the trim tool 28 will be reciprocated to its normal disposition.

As soon as the disc 90 has been cut from the end wall of the boss 88, the substrate and barrier film may descend to a position wherein they are supported by the platform 66 and pad 64. While the barrier film descends, the terminal edge 94 is constricted around the carrier 44 since it has a smaller diameter. While the outer periphery of the cover 80 need not be supported, the portion of the cover 80 around the flange 84 will be resiliently supported.

It will be noted that the cutting of the disc 90 converts the boss 88 into an annular flange 92 having a free terminal edge 94. Further, it will be noted that the resultant disposition of the cover 82 is such that the free end portion of the flange 92 is now juxtaposed to the terminal end of the finger 62.

Motor fluid is now introduced into the cylinder 70 to reciprocate rod 55 downwardly as illustrated in FIGURE 7. Downward reciprocation of rod 55 results in downward reciprocation of the carriage 60 and the finger 62. The axially extending passageway which merges into a curved outwardly extending passageway between the lower end of the carrier 44 and the upper end of the base 50 causes the finger 62 to move outwardly as illustrated in FIGURE 7. Such outward movement of the terminal portion of the fingers 62 effect a stretching out of the flange 92 to cause the same to embrace the outer periphery of the boss 88 as illustrated in detail in FIGURE 8. The stretching force is exerted on portions of the flange 92 which are juxtaposed to a varying contour on the flange 84 thereby enabling a pronounced stretching out of flange 92 and cause the flange 92 to conform to the general contour of the flange 84. The flange 92 is stretched in all radial planes at the same time. Radial planes are necessary to permit the stretching effect to be exerted on large areas of the barrier film to eliminate rupture of the film while achieving a high degree of even tension. The even expanding force exerted on the flange 92 causes it to dilate until it has somewhat exceeded the diameter of the flange 84. Thinning out of the film is kept to a low value since the stretching is imposed over the vertical and into the flat plane base area and the needed material is drawn from a relatively large surface area of the barrier film 86.

When the dilating, stretching and drawing force is applied outwardly and evenly at or just below the rim area of the flange 84, the walls of the plastic flange 92 will be drawn firmly and snugly over the profile of the flange 84. Further expanding of the flange 92 outwardly and downwardly advances the free edge 94 thereof to a point where it is of a diameter substantially greater than the diameter of the flange 84. Tensional forces are now acting on all of the flange 92 so that it extends downwardly to the flat planar area of the cover 80.

The advance of the forming members 62 for their full stroke causes the leading edge portions of said forming members to advance through an arcuate path. This upward tilting of the leading edge portions permits the stretched and tensioned plastic terminal edge 94 to escape. Simultaneously, the inner faces of the forming fingers 62 are pressed in intimate contact with the area of the barrier film which has been drawn up and over the flange 84. Even after the terminal edge 94 has snapped off the leading edges of the fingers 62, the remainder of the flange 92 is held firmly in contoured juxtaposition with respect to the flange 84 so that there is no loss of tension or recoil of the plastic material during the momentary transition period when the terminal edge 94 escapes from the fingers 62.

When the barrier film is thin such as a film having a thickness of .010 inch, the pad 64 resiliently supports the portion of the cover 80 around the flange 84. The compressive force of the stroking of the fingers 62 compresses the pad 64 (compare thickness of pad 64 in FIGURES 6 and 7) and creates tension between the pad 64 and the juxtaposed portion of the barrier film 86. This enables the thusly attained forming of the flange 92 to be retained and prevents recovery of the material of the barrier film 86. If the barrier film 86 has a thickness such as .030 inch, the pad 64 may be omitted. When the barrier film has a thickness of approximately .010 inch, the leading edge on the fingers 62 are preferably provided with a bead to minimize the likelihood of tearing the film.

Thereafter, the rod 55 will be reciprocated upwardly to remove the forces of the finger 62 tending to expand the film thereby enabling the elastic tension of the flange 92 to return as far as possible to its original diameter. Since the material of the flange 92 has not been stretched beyond its elastic limit, it will constrict itself around the outer profile of the flange 84 and be snugly retained therearound with some tension in its new configuration as illustrated in FIGURE 8.

The completed assembly now features a rigid substrate provided on its inner surface with an uninterrupted barrier film. The barrier film is now joined to the substrate by the flange 92 and its cooperation with the flange 84. Thereafter, the composite cover may be moved upwardly until it is clear of the cutting edge 42. The disc 90 will have previously been removed. Thereafter, the process may be repeated. It will be noted that while the plastic material of the flange 92 has been caused to conform to the contour of the flange 84, the fingers 62 do not likewise follow the contour of the flange 84.

In FIGURES 10 and 11, there is illustrated another embodiment of the apparatus of the present invention designated generally as 100. The apparatus 100 is particularly adapted for manual operation. Apparatus 100 performs a useful function in that it enables the barrier film to be replaced in the field when such film is accidentally torn or otherwise considered unacceptable. In view of the close similarity of the apparatus 10 and the apparatus 100, corresponding elements of apparatus 10 are provided with corresponding primed numerals.

The apparatus 100 includes a base 102 having a central axial bore 104 and a radially outwardly directed peripheral bead 103. A bushing 106 is reciprocally guided by the bore 104 and coupled at its upper end to a substantially horizontally disposed carriage 108 by means of a bolt 110.

The carriage 108 is provided with an upstanding tubular handle 112. A handle grip 114 is telescopically disposed over the handle 112 and provided with finger grip portions 116. The bushing 106 and the carriage 108 are biased upwardly against a limit stop effected by setscrew 118 by means of a spring 117. Spring 117 is disposed within the bore 104 and extends between a radially inwardly directed flange 119 and the lower surface of the bushing 106.

The carriage 108 is provided with a peripheral notch 126 within which is disposed the uninterrupted band 63' having depending discrete fingers 62'. The band 63' is retained in the notch 126 by means of strap 122 which may have its tension adjusted by means of clamp 124. A resilient constrictor 120 surrounds the fingers 62' at a point approximating the upper end of the base 102. It will be noted that the base 102 is provided with an outer peripheral surface which is axially directed and which merges into the curved surface 58'.

In operation, the apparatus 100 is substantially identical with that described above except as will be made clear hereinafter. The substrate or cover 80' will have a barrier film 86' juxtaposed thereto with a boss extending through the aperture defined by the flange 84' on the substrate or cover 80'. Manually, the boss end wall will be cut to produce the flange 92'. Thereafter, the base 102 will be inserted through the hole in the end wall of the boss so as to effect the disposition illustrated in FIGURE 10. By manually applying pressure to the carriage 108 by way of the handle 112, the fingers 62' may be caused to be reciprocated to effect a stretching of the flange 92' in the same manner as described above.

Each of the embodiments of the present invention are rapid, efficient, reliable and facilitate the economical joining of a barrier film to a rigid substrate.

The stretching of the barrier film flange and subsequent constriction around the substrate flange is a type of snap fitting operation. It will be noted that the free end of the barrier film flange has a diameter which is less than and below the largest diameter of the substrate flange, see FIGURE 8. As will be obvious from the above, the joining operation is effected without the use of adhesive.

For purposes of illustration, the axial length of the flange 84 may be about ¼ of an inch whereas the axial length of the boss 88 would be about ⅜ of an inch when used therewith. From these figures, one may appreciate the shallowness of the draw when forming the boss 88 and the relative dimensions of axial lengths of the flanges on which the present invention has performed successfully.

While the fingers 62 or 62' are preferably made of Teflon, they may be made of polyethylene, polypropylene, spring metal, etc. The barrier film 86 may be any of a wide variety of resilient polymeric materials capable of acting as an elastometer.

The present invention may be embodied in other specific forms without departing from the spirit or essential attributes thereof and, accordingly, reference should be made to the appended claims, rather than to the foregoing specification as indicating the scope of the invention.

It is claimed:

1. Apparatus for joining a barrier film to a substrate comprising a base having an axially extending annular surface merging into a downwardly and outwardly directed curved guide surface, a carriage above said base, flexible forming members secured in a circumferential arrangement to said carriage, free end portions of said members extending along said surfaces, means for selectively maintaining said carriage above said base, and means for selectively moving said carriage toward said base so that the terminal portion of said members flex substantially radially outwardly with respect to the axis of movement of said carriage, whereby said flexing movement of said terminal portions of said members may cause a barrier film to be caused to overlap a flange on a substrate.

2. Apparatus in accordance with claim 1 wherein said flexible forming members are a plurality of sheet-like members secured at their upper end to said carriage, and an axially extending portion of said base guiding said carriage during movement of said carriage with respect to said base.

3. Apparatus in accordance with claim 1 wherein said means for moving said carriage toward said base includes a rod-like member secured to said carriage, said rod-like member having a longitudinal axis substantially perpendicular to the plane of said carriage.

4. Apparatus in accordance with claim 1 wherein said means for moving said carriage toward said base includes a handle coupled to the carriage for manual reciprocation of the carriage.

5. Apparatus in accordance with claim 1 wherein said means for moving said carriage includes a rod extending through a bore in said base.

6. Apparatus in accordance with claim 1 wherein said flexible forming members are circumferentially disposed about the outer periphery of said carriage.

7. Apparatus in accordance with claim 1 including a trim tool supported above said carriage, a cutting surface on said trim tool, an anvil above said carriage, said anvil having a cutting surface juxtaposed to the cutting surface on said trim tool, and means supporting said anvil in a rigid manner.

8. Apparatus in accordance with claim 7 including means for selectively heating the cutting surface on said trim tool.

9. Apparatus in accordance with claim 7 including a carrier coupled to said anvil and surrounding said carriage, said carrier having guide surfaces corresponding to but spaced from the axial and curved guide surfaces on said base, the distance between the juxtaposed surfaces on said carrier and base being spaced apart for a distance slightly greater than the thickness of said flexible forming members.

10. Apparatus for joining a barrier film to a rigid substrate comprising a base having an axially extending annular surface merging into a downwardly and outwardly directed curved guide surface, an anvil supported by said base above said base, the upper surface of said anvil having a cutting edge, a carriage disposed between said base and anvil, means guiding said carriage for reciprocation toward and away from said base, means for reciprocating said carrier toward and away from said base, flexible forming members circumferentially disposed about said carriage and extending to said guide surfaces on said base, said flexible forming members being adapted to move with said carriage and be deflected substantially radially outwardly by said guide surface.

11. Apparatus in accordance with claim 10 including an annular carrier surrounding said carriage and coupled to said anvil, said carrier terminating at its lower end in an axially extending surface merging into a downwardly and outward directed curved guide surface, said last mentioned surfaces being juxtaposed to said surfaces on said base and spaced therefrom by a distance corresponding to approximately the thickness of said flexible forming members.

12. Apparatus in accordance with claim 10 including a trim tool disposed above said anvil and mounted for reciprocation toward and away from said anvil, said trim tool having a cutting surface corresponding to and disposed above the cutting edge on said anvil.

13. Apparatus for joining the boss of a barrier film to the flange of a rigid substrate and adapted to extend through the boss and flange comprising a cylindrical base having an axially extending annular surface merging into a downwardly and outwardly directed curved guide surface, a carriage above said base, said base having a bore, a member at least partially disposed within said bore and coupled to said carriage for guiding said carriage for reciprocatory movement toward and away from said base, an annular band secured to said carriage, a plurality of flexible forming members depending from said band and integral at one end with said band, said flexible forming members extending along said axially directed and curved guide surfaces, means for moving said carriage toward and away from said base so that said curved surface may cause said flexible forming members to be deflected substantially radially outwardly.

14. Apparatus for joining a barrier film to a substrate comprising an annular base having a curved guide surface extending downwardly and outwardly, a carriage above said base, circumferentially disposed flexible forming members secured to said carriage, free end portions of said members extending along said guide surface, means for selectively moving said carriage toward said base so that the terminal portion of each of said members are caused by said guide surface to flex outwardly and move through an arcuate path with respect to the axis of movement of said carriage, whereby said flexing movement of said members may cause a barrier film to be joined to a substrate.

References Cited

UNITED STATES PATENTS

| | | | |
|---|---|---|---|
| 1,319,297 | 10/1919 | Limacher | 29—235 X |
| 1,601,549 | 9/1926 | Wurtenberg | 29—235 |
| 1,884,643 | 10/1932 | Forbes | 29—235 X |
| 2,475,732 | 7/1949 | Yeo. | |
| 2,574,195 | 11/1951 | Sherrick | 29—235 X |
| 2,779,996 | 2/1957 | Tanis | 29—235 |
| 2,497,921 | 2/1950 | Ballard | 29—450 |
| 2,803,056 | 8/1957 | Brissey et al. | 29—450 |
| 1,793,454 | 2/1931 | Bengtson | 29—235 |
| 2,038,840 | 4/1936 | Hall | 29—235 |

FOREIGN PATENTS 255,502  10/1927  Italy.

CHARLIE T. MOON, *Primary Examiner*.

WHITMORE A. WILTZ, *Examiner*.